United States Patent [19]

Okamoto et al.

[11] Patent Number: 5,062,494

[45] Date of Patent: Nov. 5, 1991

[54] HYDRAULIC POWER STEERING APPARATUS FOR INDUSTRIAL VEHICLE

[75] Inventors: Tsukasa Okamoto; Shuji Ohta, both of Kariya, Japan

[73] Assignee: Kabushiki Kaisha Toyoda Jidoshokki Seisakusho, Kariya, Japan

[21] Appl. No.: 569,936

[22] Filed: Aug. 20, 1990

[30] Foreign Application Priority Data

Aug. 22, 1989 [JP] Japan ................................. 1-215407

[51] Int. Cl.$^5$ ............................................. B62D 5/06
[52] U.S. Cl. ...................................... 180/132; 280/91
[58] Field of Search ............... 180/132, 133, 148, 151; 280/91

[56] References Cited

U.S. PATENT DOCUMENTS

| 4,558,759 | 12/1985 | Beatrup et al. | 180/132 |
| 4,798,256 | 1/1989 | Fassbender | 180/132 X |

FOREIGN PATENT DOCUMENTS

| 95256 | 6/1982 | Japan | 180/132 |
| 167371 | 9/1984 | Japan | 180/132 |
| 61-270646 | 11/1986 | Japan . | |
| 64-16485 | 1/1989 | Japan . | |
| 103573 | 4/1989 | Japan | 180/132 |

*Primary Examiner*—Charles A. Marmor
*Assistant Examiner*—Alan M. Kagen
*Attorney, Agent, or Firm*—Brooks Haidt Haffner & Delahunty

[57] ABSTRACT

A fully hydraulic power steering apparatus provided with a hydraulic power cylinder driven by turning a steering wheel to provide rear wheels of an industrial vehicle with a pivoting motion, to thereby steer the vehicle, and an error correcting unit for mechanically correcting an error between an angle of turn of the steering wheel and a corresponding stroke motion of the hydraulic power cylinder. The error correcting unit mechanically derives respective linear movements from the angle of turn of the steering wheel and the corresponding stroke of the power cylinder, and utilizes a difference between both mechanical linear movements for operating a directional control valve for controlling a flow of a pressurized oil supplied from a power steering valve unit toward the power cylinder to correct the amount of the stroke of the power cylinder with respect to the amount of angle by which the steering wheel is turned.

8 Claims, 9 Drawing Sheets

HYDRAULIC POWER STEERING APPARATUS FOR INDUSTRIAL VEHICLE

BACKGROUND OF THE INVENTION

1. Field of the Invention

The present invention relates to a fully hydraulic power steering apparatus for industrial vehicles such as lift trucks, and more particularly, relates to a fully hydraulic power steering apparatus provided with a means for correcting an error between an angle of turn of a steering wheel and a pivoting angle of tires of rear wheels on an industrial vehicle. Note, it is to be understood hereinafter that the expression "fully hydraulic" means that a hydraulically operated power steering apparatus does not include a mechanical connection between a steering wheel and wheels to be pivoted for steering an industrial vehicle.

2. Description of the Related Art

In the field of industrial vehicles, a fully hydraulic power steering apparatus is now employed to enhance the manual operability of a steering system of the vehicle. FIG. 12 illustrates a typical example of such a conventional fully hydraulic power steering apparatus for an industrial lift truck. The power steering apparatus of FIG. 12 is provided with a power steering valve unit 52 operated by a steering wheel 51, a double-rod type hydraulic power cylinder 54 for causing a pivoting of rear wheels 55 (in such industrial vehicles, the rear wheels are pivoted by the steering gear) to thereby steer a vehicle having the steering wheels 55, and hydraulic lines 56 and 57 interconnecting the power steering valve unit 52 and the power cylinder 54. When the steering wheel 51 is turned by a driver, the power steering valve unit 52 admits a part of pressurized oil delivered from a hydraulic pump 53 into the power cylinder 54, and accordingly, the power cylinder 54 causes a pivoting of the rear wheels 55. The amount of the part of the pressurized oil admitted is proportional to an angle of turn of the steering wheel 51. Nevertheless, since the above-mentioned fully hydraulic power steering apparatus does not provide a mechanical relationship between the steering wheel 51 and the rear wheels 55 to be pivoted, often an error appears between the angle of turn of the steering wheel and the pivoting angle of the rear wheels corresponding to an amount of stroke of the rods of the power cylinder, due to a leakage of the pressurized oil within the power steering valve unit 52 caused by repeated steering operations. Accordingly, in a forklift truck provided with a steering wheel 51 having a knob 51a, the above-mentioned angular error discomforts the driver because the neutral position of the steering wheel 51 is gradually moved from a predetermined position at which it should be located during a straight line running of the vehicle, and this causes a lessening of the control of the vehicle by the driver.

To solve the above-mentioned problem, a sensing element 61 for detecting an angle of turn of the steering wheel 51, and a further sensing element 62 for detecting a stroke of the power cylinder 54, are both connected to an electronic controller 63 which constantly monitors whether or not a delay has occurred in the motions of the steering wheel and the power cylinder 54, and when an amount of such a delay exceeds a predetermined reference value, the controller 63 opens a solenoid-operated valve 64 to thereby permit the pressurized oil to flow from a high pressure side to a low pressure side (an oil tank side) of the power cylinder 54, and accordingly, the motion of the power cylinder 54 is delayed to compensate for the afore-mentioned angular error.

Nevertheless, when the electronic controller 63 is employed, detection signals generated by and transmitted from the sensing elements 61 and 62 must be accurate. Since the sensing element 62 for detecting the stroke of the power cylinder 54 is arranged adjacent to the tires of the rear axle of an industrial vehicle, dust and mud are apt to cover the element 62 during the running of the vehicle, and therefore, it is necessary to ensure that the operation of the sensing elements 61 and 62 is always reliable and accurate without suffering from an adverse affect of coverage by a foreign substance such as dust, dirt, and water. The two sensing elements 61 and 62 must be dust-proof and water-proof, and accordingly, these elements are expensive. Further, the electronic controller 63 using a micro-processor and associated electronic components must be protected against water and vibration, when mounted on the vehicle, and therefore, the electronic controller 63 is very costly. Moreover, the employment of the electronic controller 63 only for processing the detection signals of the two sensing elements 61 and 62 leads to an increase in the cost of manufacturing the industrial vehicle, i.e., a problem arises in that the conventional industrial vehicle becomes more expensive when the electronic controller for correcting the operation of the fully hydraulic power steering apparatus is accommodated therein.

SUMMARY OF THE INVENTION

Therefore, an object of the present invention is to solve the problem encountered by the conventional fully hydraulic power steering apparatus for an industrial vehicle when the apparatus uses an electronic controller for correcting the operation thereof.

Another object of the present invention is to provide a fully hydraulic power steering apparatus for an industrial vehicle such as a lift truck, which employs a mechanical means for correcting only an error between an angle of turn of the steering wheel and a pivoting angle of the rear wheels of the vehicle, without the help of an electronic controller.

A further object of the present invention is to provide an industrial vehicle accommodating a fully hydraulic power steering apparatus therein without raising the manufacturing cost thereof.

In accordance with the present invention, there is provided a fully hydraulic power steering apparatus for hydraulically steering an industrial vehicle by pivoting the rear wheels of the vehicle, the apparatus comprising:

a steering wheel turned by a driver of the vehicle;

a power steering hydraulic valve unit operated by the steering wheel for delivering pressurized oil;

a double-rod type power cylinder including a pair of oil chambers for receiving the pressurized oil when delivered from the power steering hydraulic valve unit, and a piston rod capable of hydraulically carrying out a stroke motion for actuating a pivoting of the rear wheels in response to a turning of the steering wheel;

oil piping interconnecting the power steering hydraulic valve unit and the pair of oil chambers of the power cylinder, respectively; and a correcting means for compensating for an error between an angle of turn of the steering wheel and an amount of stroke motion of the piston rod of the power cylinder, said correcting means including a first means for deriving a first mechanical motion from the turn of the steering wheel, a second means for deriving a second mechanical motion from the stroke motion of the piston rod of the power cylinder, and a hydraulic correcting means for hydraulically correcting the stroke motion of the piston rod of the power cylinder in response to an error in the first and second mechanical motions.

Preferably, the first means comprises a motion transmitting means for converting the turn of the steering wheel into a linear movement of a first mechanical element, the second means comprises a second mechanical element operatively connected to the piston rod of the power cylinder to be linearly moved together with the piston rod upon carrying out the stroke motion, and the hydraulic correcting means comprises connecting oil piping capable of interconnecting the pair of oil chambers of the power cylinder; a directional control hydraulic valve arranged in the connecting oil piping for controlling a flow of a part of the pressurized oil delivered from the power steering hydraulic valve unit toward either one of the pair of oil chambers of the power cylinder to thereby compensate the stroke motion of the power cylinder, the directional control hydraulic valve being provided with a linearly movable valve body connected to the second mechanical element of the second means, and a valve spool arranged to be linearly slidable in the valve body and connected to the first mechanical element of the first means. Preferably, the control operation of the directional control hydraulic valve is brought into operation when the error between the angle of turn of the steering wheel and the amount of stroke motion of the piston rod of the power cylinder exceeds a predetermined value set by the initial positional relationship between the valve body and the valve spool.

BRIEF DESCRIPTION OF THE DRAWINGS

The above and other objects, features and advantages of the present invention will become apparent from the ensuing description of preferred embodiments with reference to the accompanying drawings wherein.

DESCRIPTION OF THE PREFERRED EMBODIMENTS

Figure 1A:
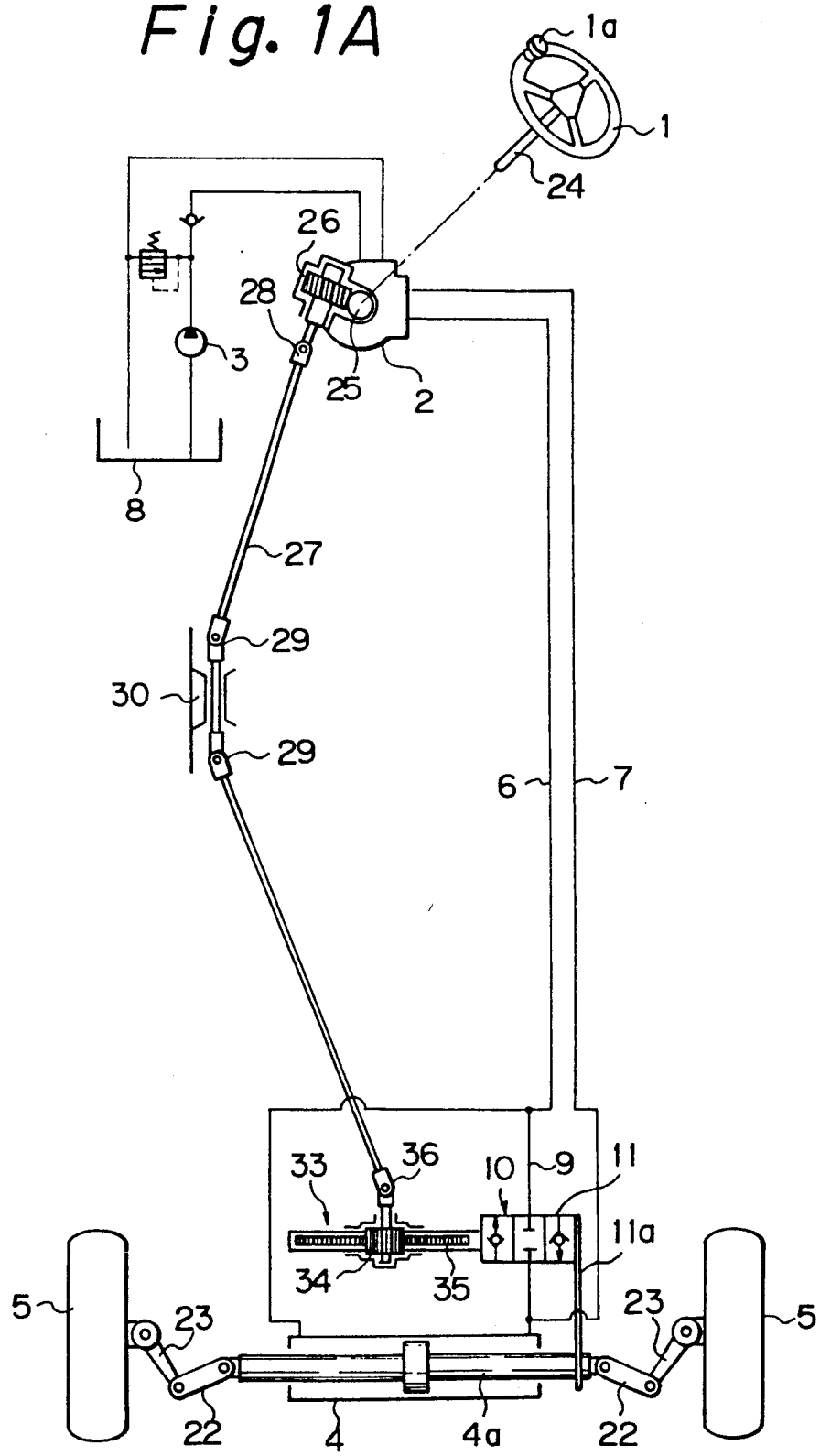
FIG. 1A is a schematic view of an entire construction of a fully hydraulic power steering apparatus according to an embodiment of the present invention.

Referring to FIG. 1A, a fully hydraulic power steering apparatus for an industrial vehicle is provided with a steering wheel 1 having a knob 1a attached thereto, and a power steering valve unit 2 operated by the steering wheel 1 to deliver a pressurized oil supplied from an oil pump 3, an amount delivered of the pressurized oil being proportional to an angle of turn of the steering wheel 1. The pressurized oil is reserved in an oil tank 8. The apparatus is further provided with a double-rod type power cylinder 4 connected to the power steering valve unit 2 via oil pipes 6 and 7, for actuating the pivoting motion of rear wheels 5.

When a driver of the industrial vehicle turns the steering wheel 1, the turning of the steering wheel 1 is transmitted to the power steering valve unit 2 via a steering shaft 24, and therefore, the valve unit 2 delivers the pressurized oil in an amount proportional to an angle by which the steering wheel 1 is turned from a neutral position, toward the power cylinder 4 via the oil pipes 6 and 7 to produce a corresponding amount of a stroke of the power cylinder, and accordingly, the power cylinder 4 actuates a corresponding amount of a pivoting motion of the rear wheels 5 to thereby steer the vehicle. When an error occurs between the angle of turn of the steering wheel 1 and an actual amount of stroke of the power cylinder 4, the stroke error is corrected by a correcting means accommodated in the fully hydraulic power steering apparatus according to an embodiment of the present invention set forth below.

Figure 2:
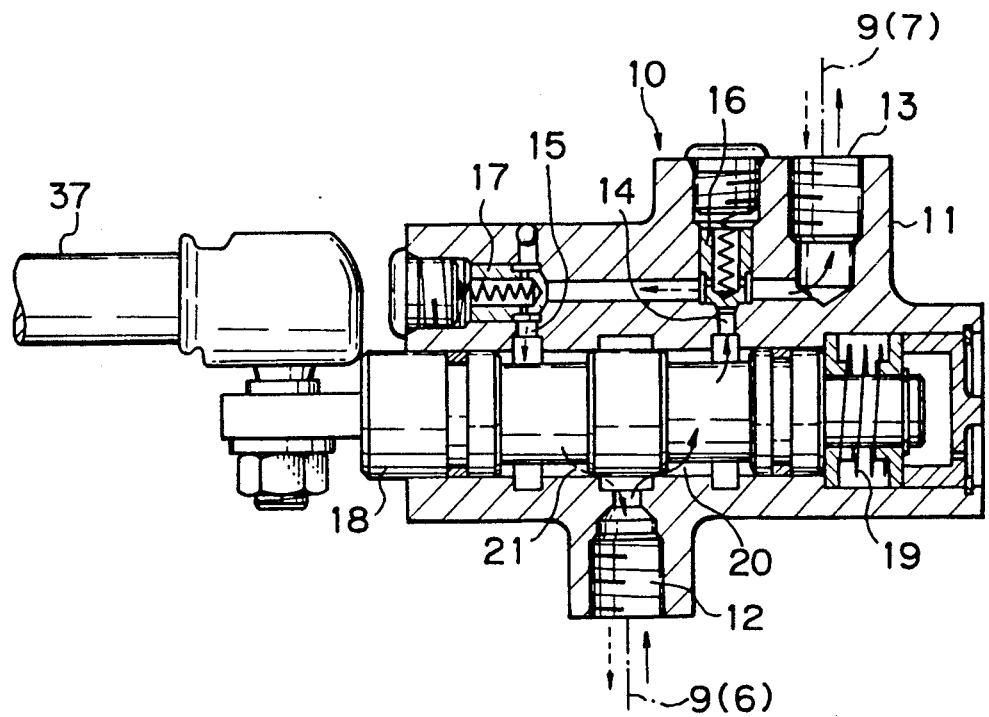
FIG. 2 is a cross-sectional view illustrating an internal construction of a directional control valve accommodated in the fully hydraulic power steering apparatus of FIG. 1.

In the correcting means of the fully hydraulic power steering apparatus, the above-mentioned oil pipes 6 and 7 are interconnected by a connecting oil piping 9 in which a directional control valve 10 is arranged for correcting a stroke error of the power cylinder. The detailed construction of the directional control valve 10 is illustrated in FIG. 2. The directional control valve 10 is provided with a valve body 11 provided with oil ports 12 and 13 connected to the above-mentioned oil pipes 6 and 7, oil passageways 14 and 15 for providing a fluid communication between the oil ports 12 and 13, and check valves 16 and 17 respectively arranged in the oil passageways 14 and 15 in such a manner that the directions of the oil flows checked by the check valves 16 and 17 are different. The valve body 11 is also provided with a spool bore formed therein to permit a valve spool 18 to slide in the spool bore. The valve spool 18 is always urged by a return spring 19 toward a initial position, i.e., a position shown in FIG. 2. When the valve spool 18 is positioned at the initial position, valve chambers 20 and 21 are both closed by a land of the valve spool 18, to thereby interrupt the fluid communication between the oil ports 12 and 13. When the valve spool 18 is axially moved in the spool bore of the valve body 11, i.e., moved left or right in FIG. 2, the valve chamber 20 or 21 is opened to be communicated with the oil port 12, and accordingly, the oil port 12 is connected to the oil port 13 via the oil passageway 14 or 15. When the oil ports 12 and 13 are interconnected, the check valves 16 and 17 determine the direction of the flow of the pressurized oil between the oil ports 12 and 13. The direction of the flow of the pressurized oil in the directional control valve 10 is determined to be either that designated by a solid line (the oil port 12→ the right valve chamber 20→ the oil passageway 14→ the oil port 13) or that designated by a broken line (the oil port 13→ the oil passageway 15→ the left valve chamber 21→ the oil port 12).

The valve body 11 of the directional control valve 10 having the above-mentioned internal construction is mechanically connected to either a piston rod 4a of the power cylinder 4, or one of a tie-rod 22 connecting the piston rod 4a to the rear wheel 5, and a knuckle 23, and the valve spool 18 of the directional control valve 10 is operatively connected to the steering wheel 1 via a later-described mechanical motion transmitting means capable of converting a rotational movement into a corresponding linear movement.

The construction and operation of the mechanical motion transmitting means will be described with reference to FIGS. 1A, 3 and 4.

Figure 4:
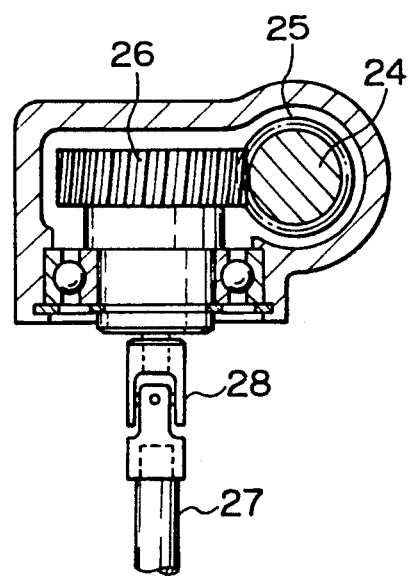
FIG. 4 is a cross-sectional view taken along the line IV—IV of FIG. 3.
Figure 3:
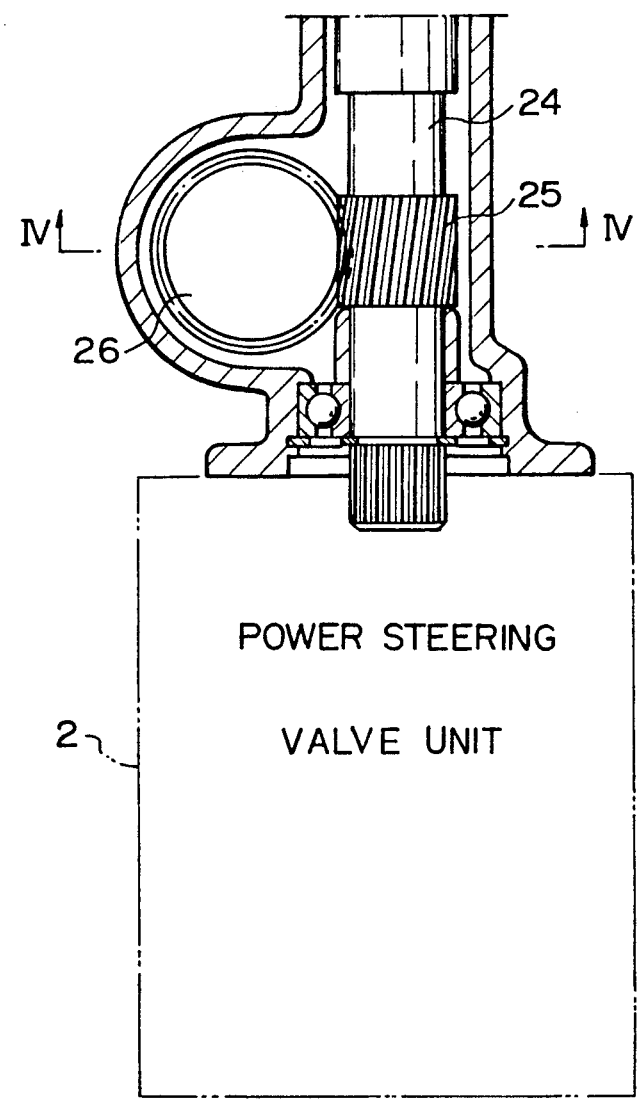
FIG. 3 is a partial cross-sectional view illustrating a mechanical unit for transmitting a turning of a steering wheel to a rotation transmitting shaft of the power steering apparatus of FIG. 1.
Figure 5:
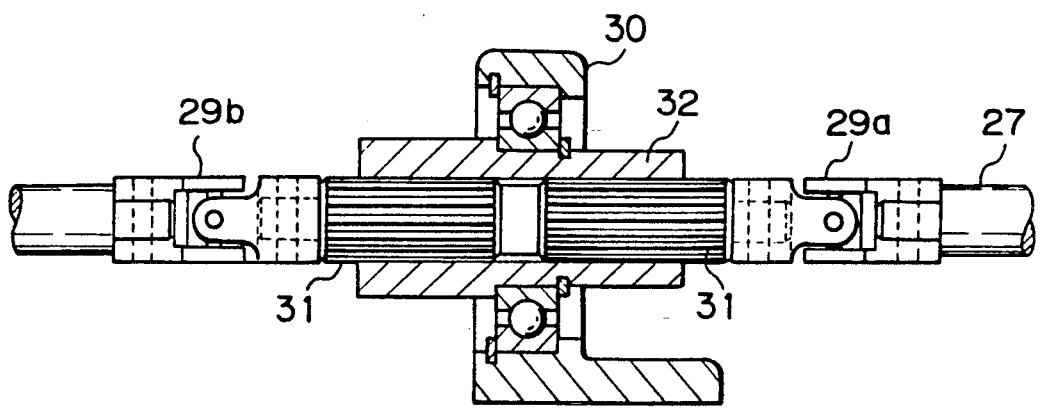
FIG. 5 is a cross-sectional view of a support for the rotation transmitting shaft of the power steering apparatus of FIG. 1.
Figure 7:
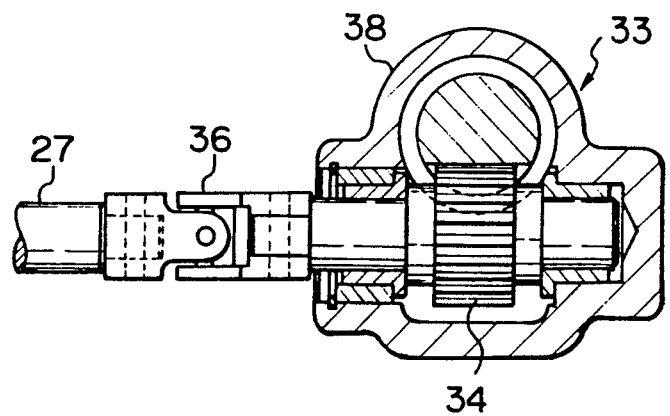
FIG. 7 is a cross-sectional view taken along the line VII—VII of FIG. 6.
Figure 6:
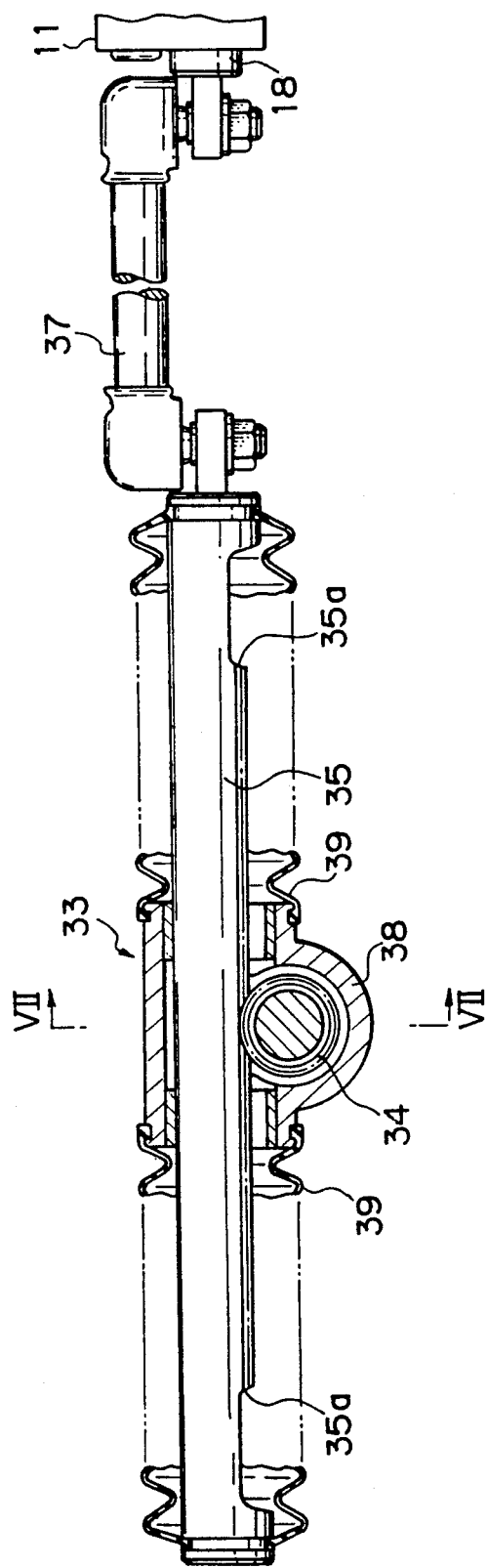
FIG. 6 is a cross-sectional view of a rack and pinion mechanism of the power steering apparatus of FIG. 1.

Referring to FIGS. 1A, 3 and 4, the turning of the steering wheel 1 to thereby operate the power steering valve unit 2 is transmitted through the steering shaft 24 to a rotation transmitting shaft 27 via a pair of drive and driven gear elements 25 and 26 arranged adjacent to the power steering valve unit 2. Namely, the drive gear element 25 is fixedly mounted on the steering shaft 24 as shown in FIG. 3, and the driven gear 26 engaged with the drive gear element 25 is connected to one end of the rotation transmitting shaft 27 via a universal joint 28. The other end of the shaft 27 is extended toward the above-mentioned directional control valve 10 via a different universal joint means 29, as required. The rotation transmitting shaft 27 is supported by an appropriate support 30. More specifically, the rotation transmitting shaft 27 is provided with a pair of universal joints 29a and 29b interconnected by a splined shaft 31 which is engaged with internal spline teeth of a hollow cylindrical member 32 rotatably supported by the above-mentioned support 30, via a ball bearing as illustrated in FIG. 5. The rotating motion of the rotation transmitting shaft 27 is converted into a corresponding linear motion by a rack and pinion mechanism 33 (FIG. 1A) and is transmitted to the directional control valve 10. Namely, as illustrated in FIGS. 6 and 7, an end of the rotation transmitting shaft 27 is mechanically connected to a pinion 34 of the rack and pinion mechanism 33 via a universal joint 36, and the pinion 34 is engaged with a toothed rack 35 having an end connected to the aforementioned valve spool 18 of the directional control valve 10 via a tie rod 37. The pinion 34 is rotatably mounted in a casing 38, and the toothed rack 35 is slidably supported by the casing 38 and covered with rubber boots 39 at both ends thereof as shown in FIG. 6.

The toothed rack 35 is provided with cutout portions 35a formed at opposite ends thereof. The cutout portions 35a of the toothed rack 35 are provided by taking it into account that the steering wheel 1 can be turned even after the power cylinder 4 reaches the end of the stroke thereof, due to, e.g., a pressure leakage inside the steering power valve unit 2. Thus, when the steering wheel 1 is further turned after the power cylinder 4 reaches the end of the stroke thereof, the pinion 34 is disengaged from the toothed rack 35 by the cutout portions 35a, and accordingly, a load is not applied to the system of the steering wheel 1. The pinion 34 disengaged from the toothed rack 34 can be easily re-engaged with the toothed rack 35 when the steering wheel 1 is turned in a reverse direction, whereby the toothed portion of the rack 35 is linearly moved to a position at which it is engageable with the pinion 34, by the power cylinder 4 via the directional control valve 10.

The above-mentioned provision of the cutout portions 35a for the toothed rack 35 permits the steering power valve unit 2 to be rotated due to an internal pressure leakage therein.

Figure 10:
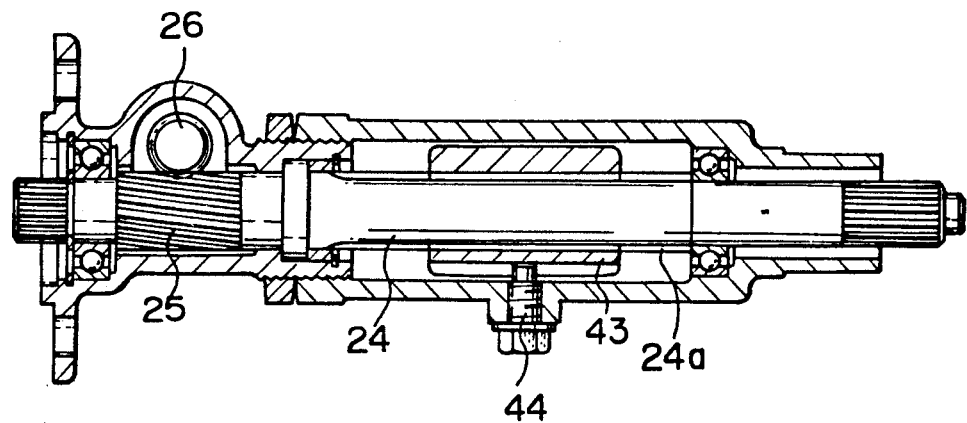
FIG. 10 is a cross-sectional view of a steering shaft provided with a stop therein, according to an embodiment of the present invention.
Figure 11:
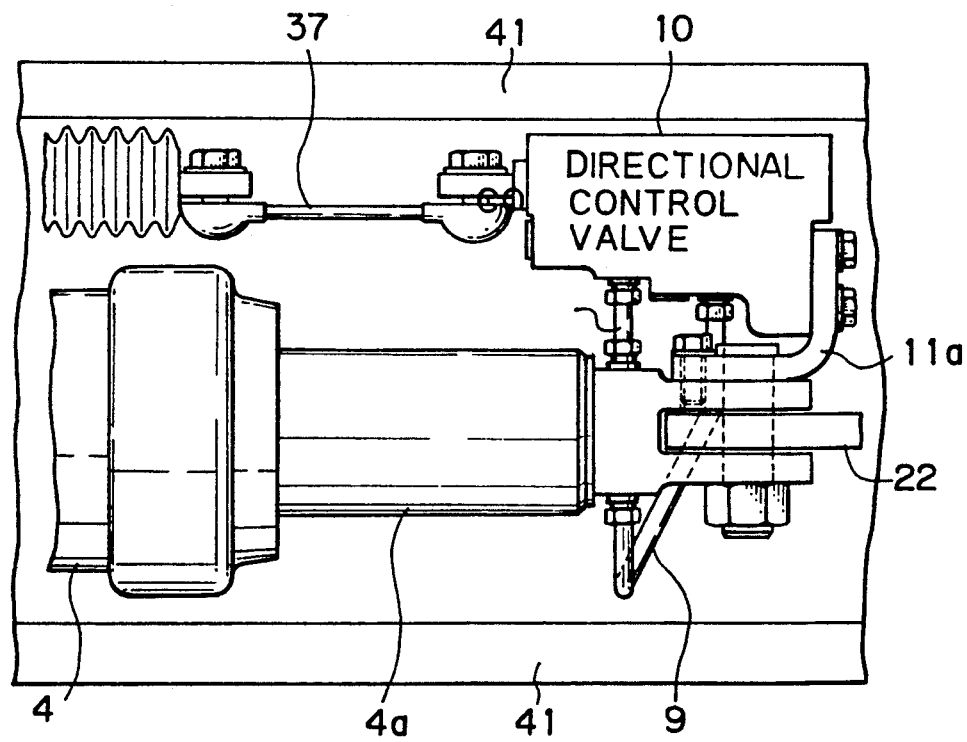
FIG. 11 is a front view illustrating an embodiment wherein stationary piping is arranged as the hydraulic piping for the directional control valve.
Figure 12:
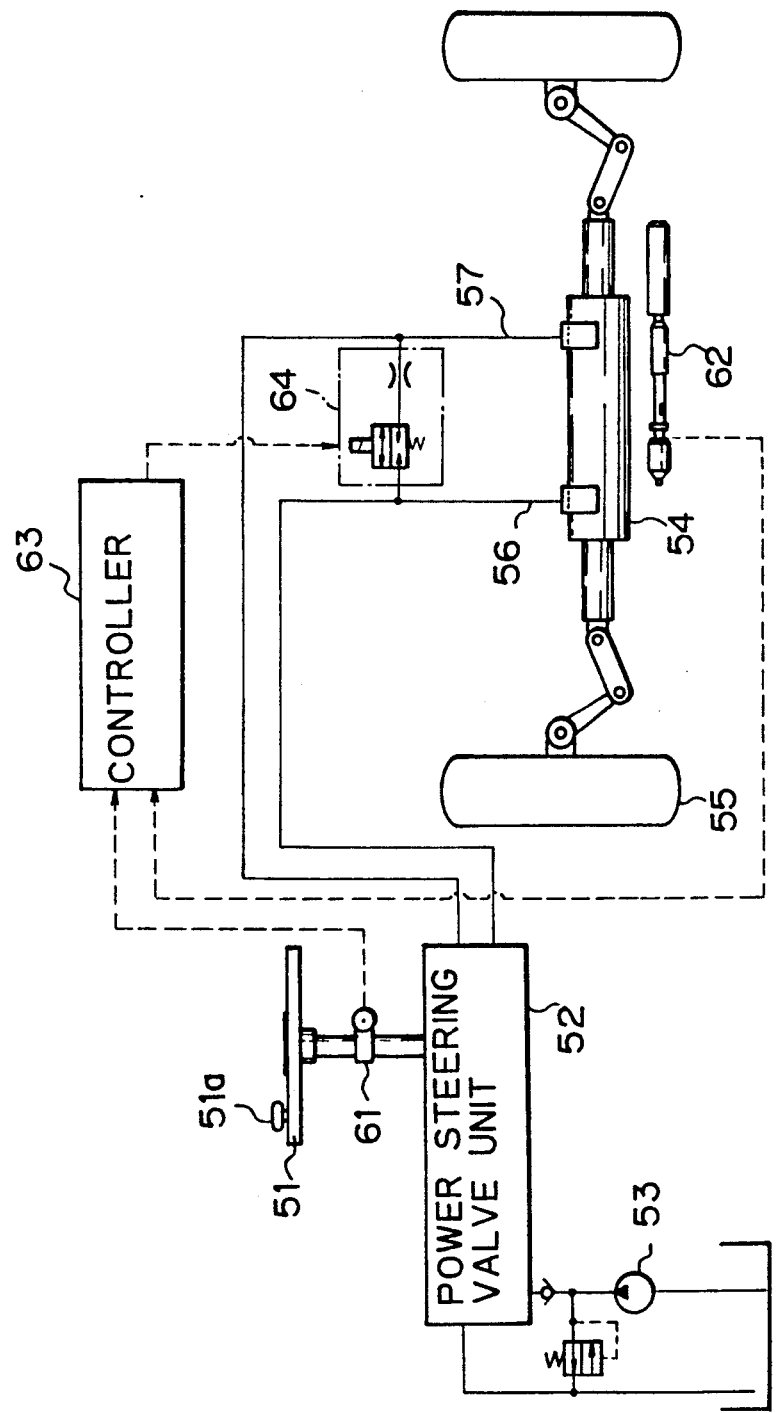
FIG. 12 is a schematic view of an example of the conventional fully hydraulic power steering apparatus.

Alternatively, the steering shaft 24 may be provided with a stop, to limit the rotation thereof beyond a predetermined rotational range and thereby prevent the valve unit 2 from being rotated by more than a predetermined amount. FIG. 10 illustrates such an alternative arrangement. Accordingly in FIG. 10, the steering shaft 24 is provided with a screw thread formed therein and engaged with a nut member 43 which can be moved only axially due to the provision of a stop pin 44 for preventing a rotation of the nut member 43.

Figure 8:
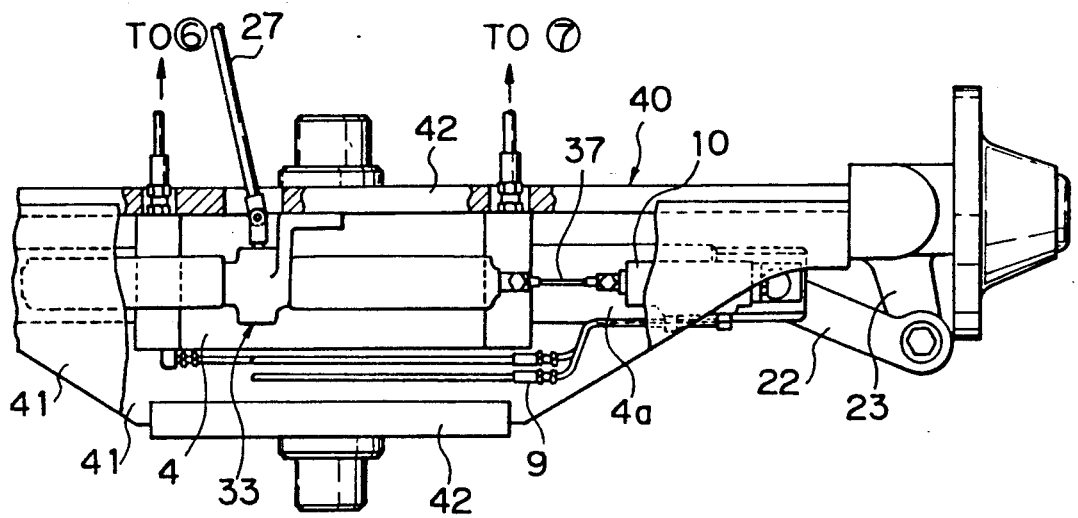
FIG. 8 is a plan view, in partial cross section, of an assembly of a power cylinder, the directional control valve, and the rack and pinion mechanism, illustrating the condition wherein the assembly is accommodated in the rear axle.
Figure 9:
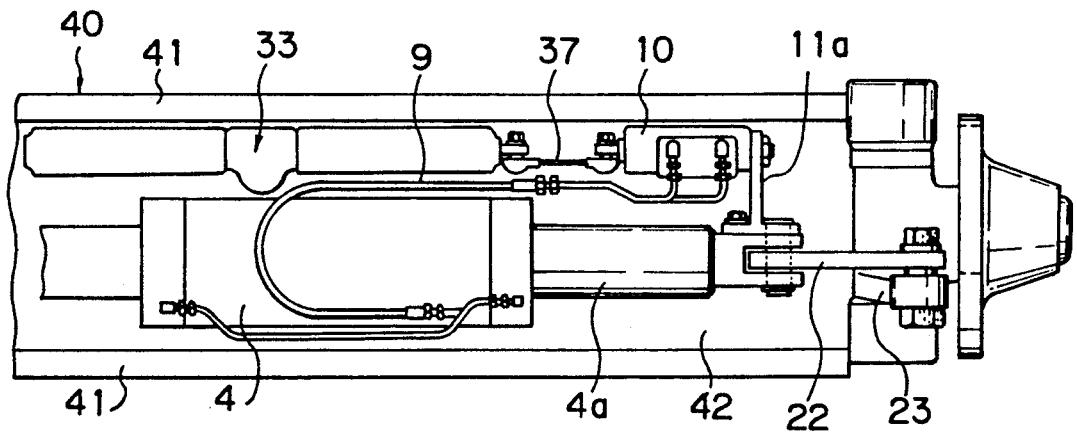
FIG. 9 is a front view, in partial cross section, of the same assembly as shown in FIG. 8.

FIGS. 8 and 9 illustrate a construction wherein the above-mentioned power cylinder 4, the directional control valve 10, and the rack and pinion mechanism 33 are mounted on a rear axle beam 40 of an industrial vehicle such as a forklift truck. The rear axle beam 40 of the forklift truck is usually formed into a substantially laterally extended box including two upper and lower plates 41 facing each other with a predetermined distance therebetween, and two front and back plates 42 connecting the upper and lower plates 41. The power cylinder 4 is mounted inside the box-like rear axle beam 40 and located at a central position therein. The rack and pinion mechanism 33 is fixedly mounted above and in parallel with the power cylinder 4, and the directional control valve 10 is arranged at one end of the rack and pinion mechanism 33 in such a manner that the valve body 11 of the directional control valve 10 is connected to the rod 4a of the power cylinder 4 via a bracket 11a, and the valve spool 18 is connected to the toothed rack 35 of the rack and pinion mechanism 33 via the tie rod 37.

In the embodiment of FIGS. 8 and 9, the connecting oil piping 9 extending from the power cylinder 4 toward the directional control valve 10 is formed by a flexible hose member, but the connecting oil piping 9 may be alternatively formed by a combination of a fixedly arranged oil pipe and an oil passageway bored in the rod 4a of the power cylinder 4.

The operation of the above-described fully hydraulic power steering apparatus will be described hereinbelow.

When the steering wheel 1 is turned to operate the power steering valve unit 2 so that the pressurized oil is delivered in an amount which is proportional to the angle of the turn of the steering wheel 1, toward one of the oil pipes 6 and 7, e.g., the oil pipe 6, the pressurized oil is supplied to a left oil chamber of the power cylinder 4 in FIG. 1. Therefore, the rod 4a is moved to the right in FIG. 1 to thereby move the valve body 11 of the directional control valve 10 in the same direction as the rod 4a. Thus, the mechanical movement of the power cylinder 4 is transmitted to the valve body 11 of the directional control valve 10.

The above-mentioned turning of the steering wheel 1 is also transmitted to the rack and pinion mechanism 33 via the engagement of the pair of drive and driven gear elements 25 and 26 and the rotation transmitting shaft 27, and accordingly, the turning motion of the rotation transmitting shaft 27 is converted into a corresponding linear motion of the toothed rack 35 of the rack and pinion mechanism 33. The toothed rack 35 in turn causes an axial movement of the valve spool 18 of the directional control valve 10 to the right in FIG. 1. In this manner the mechanical turning of the steering wheel 1 is transmitted to the valve spool 18 of the directional control valve 10.

As a result, if no error exists between the angle of turn of the steering wheel 1 and the corresponding amount of stroke of the power cylinder 4, the directional control valve 10 is maintained at a closed position thereof, since there is no relative movement between the valve body 11 and the valve spool 18, and accordingly, a stroke correcting action is not made at the power cylinder 4 of the fully hydraulic power steering apparatus.

Nevertheless, when an error exists between the angle of turn of the steering wheel 1 and the corresponding amount of stroke of the power cylinder 4 in such a manner that the turning of the steering wheel 1 is delayed with respect to the actual stroke of the power cylinder 4, the stroke correcting action is made at the power cylinder 4. Thus, when the motion of the steering wheel system is delayed with respect to the stroke of the power cylinder 4, the valve spool 18 is pulled out of the valve body 11 (to the left in FIG. 2), due to the relative movement of the elements 11 and 18, and accordingly, the right valve chamber 20 of the directional control valve 10 (FIG. 2) is opened to provide a fluid communication between the high pressure and low pressure oil ports 12 and 13. Accordingly, a part of the pressurized oil delivered from the power steering valve unit 2 toward the oil pipe 6 (high pressure) flows in the directional control valve 10, in the direction designated by the solid arrows, toward the oil pipe 7 (low pressure). Accordingly, the motion of the stroke of the power cylinder 4 is compensated to correct the time delay of the turning of the steering wheel 1 with respect to the stroke of the power cylinder 4. Thus, it will be understood that, according to the correcting means of the present invention, the stroke of the power cylinder 4 is maintained proportional to an angle by which the steering wheel 1 is turned even if an error exists in the amount the pressurized oil delivered from the power steering valve unit 2.

When an error between the angle of the turn of the steering wheel 1 and the corresponding amount of the stroke of the power cylinder 4 occurs in such a manner that the turning of the steering wheel 1 is advanced with respect to the actual stroke of the power cylinder 4, the valve spool 18 is retracted into the valve body 11 (to the right in FIG. 2), due to the relative movement of the valve spool 18 and the valve body 11, and accordingly, the left valve chamber 21 of the directional control valve 10 (FIG. 2) is opened to the oil port 12. Nevertheless, the check valve 17 prevents a fluid communication between the oil port 12 (high pressure) and the oil port 13 (low pressure), and therefore, the pressurized oil is not permitted to flow from the high pressure oil port 12 toward the low pressure oil port 13. Thus, where the turning of the steering wheel 1 is advanced with respect to the corresponding stroke of the power cylinder 4, no correcting action is carried out. Nevertheless, when the steering wheel 1 is subsequently turned in the reverse direction to be returned to the neutral position thereof, a correcting action is again carried out to compensate for a delay of the turning of the steering wheel 1 with respect to the stroke of the power cylinder 4. In this case, the operation of the directional control valve 10 is contrary to that carried out by the valve 10 in the aforementioned correcting action. Since the pressurized oil is delivered from the power steering valve unit 2 into the oil pipe 7 by the reverse turning of the steering wheel 1, the directional control valve 10 permits the pressurized oil to flow from the oil port 13 (high pressure) toward the oil port 12 (low pressure) in the direction designated by the broken line arrows in FIG. 2 to thereby correct the operation of the power cylinder 4.

In the illustrated embodiment of the present invention, a mechanical motion transmitted from the steering wheel system to the directional control valve 10, i.e., the valve spool 18, is set to be different from the other mechanical motion transmitted from the power steering system to the directional control valve 10, i.e., the valve body 11. That is, the gear ratio between either the drive and driven gears 25 and 26 or the rack and pinion mechanism 33 of the steering wheel system is set in such a manner that the speed of the movement of the rack 35 of the rack and pinion mechanism 33 is always delayed with respect to that of the power cylinder 4. By this setting of the gear ratio, when the steering wheel 1 is turned, the relative movement between the valve body 11 and the valve spool 18 due to the error between the turning angle of the steering wheel 1 and the stroke of the power cylinder 4 occurs more quickly than when the ratio of the movement speed between the toothed rack 35 and the power cylinder 4 is set at 1.0. Thereby a quicker reaction of the directional control valve 10 for correcting the error between the turning angle of the steering wheel 1 and the stroke of the power cylinder 4 can be obtained.

Further, the arrangement of the check valves 16 and 17 in the oil passageways 14 and 15 of the directional control valve 10 effectively prevents a reverse flow of the pressurized oil when the steering wheel 1 is quickly turned in a reverse direction during the correcting action of the directional control valve 10 to permit the flow of the pressurized oil from the high pressure side toward the low pressure side via the connecting oil piping 9, and therefore, a correct operation of the power cylinder 4 is guaranteed. More specifically, for example, when the pressurized oil flows from the oil pipe 6 toward the oil pipe 7 through the oil port 12, the valve chamber 20, the oil passageway 14, and the oil port 13 of the directional control valve 10, even if the steering wheel 1 is suddenly turned in a reverse direction, the check valve 16 prevents a reverse flow of the pressurized oil in the directional control valve 10, i.e., the flow of the pressurized oil from the oil port 13 toward the oil port 12 via the oil passageway 14 and the valve chamber 20. Therefore, the above-mentioned flow of the pressurized oil from the oil pipe 6 toward the oil pipe 7 is not adversely affected by the reverse turning of the steering wheel 1, and accordingly, the power cylinder 4 can be correctly operated.

Figure 1B:
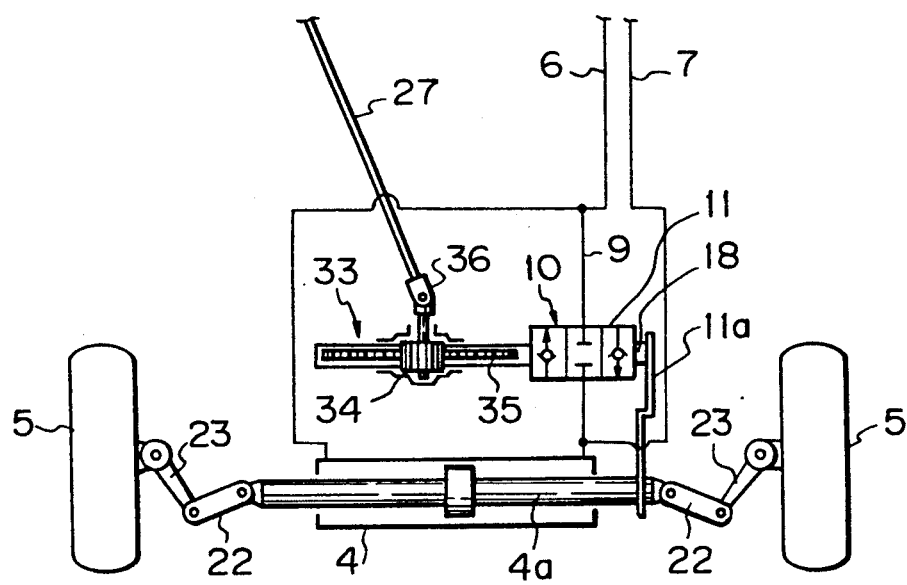
FIG. 1B is a partial schematic view illustrating a modification of a part of the fully hydraulic power steering apparatus of FIG. 1.

In the arrangement of the described embodiment, the steering wheel system is connected to the valve spool 18, and the power steering system is connected to the valve body 11 of the directional control valve 10 of the error correcting means. Nevertheless, it should be understood that a modification may be made in which the steering wheel system is connected to the valve body 11 and the power steering system is connected to the valve spool 18, as schematically illustrated in FIG. 1B, to achieve an error correction identical with that achieved by the arrangement of FIG. 1A, between the steering wheel system and the power steering system. In the modification of FIG. 1B, however, preferably the motion speed of the steering wheel system is made quicker than that of the power steering system, by making the movement of the valve body 11 caused by the steering system quicker than that of the valve spool 18 caused by the power steering system.

In the afore-described embodiment of the error correcting means, the connecting oil piping 9 is arranged to interconnect the oil pipes 6 and 7 via the directional control valve 10. Alternatively, it is possible to arrange the connecting oil piping 9 to directly interconnect the right and left valve chambers of the power cylinder 4 via the directional control valve 10.

From the foregoing description, it will be understood that, according to the present invention, both an angle of turn of the steering wheel and a corresponding stroke of the power cylinder are taken as a mechanical linear movement, respectively, and a difference between both mechanical linear movements is utilized for operating the directional control valve of the error correcting means. Therefore, compared with the conventional error correcting means employing an electronic controller, a low cost fully hydraulic power steering apparatus provided with an error correcting means can be obtained according to the present invention. In addition, since the motion transmitting system of the steering wheel system is used for transmitting only an amount of torque necessary for operating the directional control valve, the size of the motion transmitting system of the steering wheel system can be reduced, and accordingly, a large space is not required for mounting the motion transmitting system on the industrial vehicle.

We claim:

1. A fully hydraulic power steering apparatus for hydraulically steering an industrial vehicle by pivoting rear wheels of the vehicle, comprising:
   a steering wheel turned by a driver of the vehicle;
   a power steering hydraulic valve unit operated by the steering wheel for delivering pressurized oil;
   a double-rod type power cylinder including a pair of oil chambers for receiving the pressurized oil when delivered from the power steering hydraulic valve unit, and a piston rod capable of hydraulically carrying out a stroke motion for actuating a pivoting of the rear wheels in response to a turning of the steering wheel;
   oil piping interconnecting the power steering hydraulic valve unit and the pair of oil chambers of the power cylinder, respectively; and
   a correcting means for compensating an error between an angle by which the steering wheel is turned and an amount of stroke motion of the piston rod of the power cylinder, said correcting means including a first mechanical means operatively and mechanically connected to said steering wheel for deriving a first mechanical motion from the turning of said steering wheel, a second mechanical means operatively and mechanically connected to said power cylinder for deriving a second mechanical motion from the stroke motion of the piston rod of said power cylinder, and a hydraulic correcting means for generating a hydraulic correction force in proportion to an error in the first and second mechanical motions which hydraulically corrects the stroke motion of the piston rod of the power cylinder.

2. A fully hydraulic power steering apparatus for hydraulically steering an industrial vehicle by pivoting rear wheels of the vehicle according to claim 1, wherein said first mechanical means comprises a motion transmitting means for converting said turning of said steering wheel into a linear movement of a first mechanical element; wherein said second mechanical means comprises a second mechanical element connected to said piston rod of said power cylinder to be linearly moved together with said piston rod when carrying out said stroke motion; and wherein said hydraulic correcting means comprises:
   a connecting oil piping capable of interconnecting said pair of oil chambers of said power cylinder;
   a directional control hydraulic valve arranged in said connecting oil piping of controlling a flow of a part of said pressurized oil delivered from said power steering hydraulic valve unit toward either one of said pair of oil chambers of said power cylinder to thereby compensate said stroke motion of said power cylinder, said directional control hydraulic valve being provided with a linearly movable valve body connected to said second mechanical element of said second mechanical means, and a valve spool arranged to be linearly slidable in said valve body and connected to said first mechanical element of said first mechanical means.

3. A fully hydraulic power steering apparatus for hydraulically steering an industrial vehicle by pivoting rear wheels of the vehicle according to claim 2, wherein said second mechanical element of said second mechanical means comprises a mechanical bracket linearly moved together with said piston rod in the same direction as said linear movement of said first mechanical element of said first mechanical means.

4. A fully hydraulic power steering apparatus for hydraulically steering an industrial vehicle by pivoting rear wheels of the vehicle according to claim 2, wherein said valve body of said directional control hydraulic valve arranged in said connecting oil piping comprises a pair of oil ports connectable to said pair of oil chambers of said power cylinder, a pair of oil passageways capable of providing a fluid communication between said pair of oil ports in response to a relative slide of said valve spool with respect to said valve body, and a pair of check valves for preventing a reverse flow of said pressurized oil in said pair of oil passageways.

5. A fully hydraulic power steering apparatus for hydraulically steering an industrial vehicle by pivoting rear wheels of the vehicle according to claim 4, wherein said directional control hydraulic valve further comprises a spring means for urging said valve spool toward a predetermined direction in said valve body.

6. A fully hydraulic power steering apparatus for hydraulically steering an industrial vehicle by pivoting rear wheels of the vehicle according to claim 2, wherein said motion transmitting means of said first mechanical means comprises a rotation transmitting shaft operatively connected to said steering wheel and a rack and pinion mechanism comprising a pinion gear connected to said rotation transmitting shaft, and a toothed rack engaged with said pinion gear and connected to said directional control hydraulic valve to be operable as said first mechanical element of said first mechanical means.

7. A fully hydraulic power steering apparatus for hydraulically steering an industrial vehicle by pivoting rear wheels of the vehicle according to claim 8, wherein said second mechanical element of said second mechanical means comprises a mechanical bracket having one end thereof connected to said valve spool of said directional control hydraulic valve.

8. A fully hydraulic power steering apparatus for hydraulically steering an industrial vehicle by pivoting rear wheels of the vehicle according to claim 1, wherein said first means comprises a motion transmitting means for converting said turning of said steering wheel into a linear movement of a first mechanical element; wherein said second means comprises a second mechanical element operatively connected to said piston rod of said power cylinder to be moved together with said piston rod upon carrying out said stroke motion; and wherein said hydraulic correcting means comprises:

connecting oil piping capable of interconnecting said pair of oil chambers of said power cylinder;

a directional control hydraulic valve arranged in said connecting oil piping for controlling a flow of a part of said pressurized oil delivered from said power steering hydraulic valve unit toward either one of said pair of oil chambers of said power cylinder to thereby compensate said stroke motion of said power cylinder, said directional control hydraulic valve being provided with a linearly movable valve body connected to said first mechanical element of said first means, and a valve spool linearly slidable in said valve body and connected to said second mechanical element of said second means.

* * * * *